United States Patent
Ramsey et al.

(10) Patent No.: US 8,103,481 B2
(45) Date of Patent: Jan. 24, 2012

(54) PROCESSING IRREGULARLY OCCURING DATA EVENTS IN REAL TIME

(75) Inventors: Mark S. Ramsey, Kihei, HI (US); David A. Selby, Nr Fareham (GB); Stephen J. Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 11/609,358

(22) Filed: Dec. 12, 2006

(65) Prior Publication Data

US 2008/0140355 A1 Jun. 12, 2008

(51) Int. Cl.
*G06F 17/00* (2006.01)
(52) U.S. Cl. .................. 702/187; 702/84; 702/179
(58) Field of Classification Search .......... 702/81, 702/84, 176, 177, 179, 182, 183, 187
See application file for complete search history.

(56) References Cited

U.S. PATENT DOCUMENTS

| | | | | |
|---|---|---|---|---|
| 5,841,676 A * | 11/1998 | Ali et al. | | 702/84 |
| 6,441,743 B1 * | 8/2002 | Berger | | 340/603 |
| 6,487,575 B1 * | 11/2002 | Oberman | | 708/504 |
| 6,718,220 B2 * | 4/2004 | Chen | | 700/108 |
| 6,839,850 B1 * | 1/2005 | Campbell et al. | | 726/23 |
| 7,024,388 B2 * | 4/2006 | Stefek et al. | | 705/38 |
| 2002/0198979 A1 * | 12/2002 | Yu | | 709/224 |
| 2004/0064290 A1 * | 4/2004 | Cabral et al. | | 702/182 |
| 2005/0060103 A1 * | 3/2005 | Chamness | | 702/30 |
| 2006/0007884 A1 * | 1/2006 | Tanaka et al. | | 370/328 |
| 2006/0182141 A1 * | 8/2006 | Duggirala et al. | | 370/465 |
| 2007/0011479 A1 * | 1/2007 | Pessolano | | 713/323 |

OTHER PUBLICATIONS

Javitz et al., "The SRI IDES Statistical Anomaly Detector", 1991 IEEE Computer Society Symposium on Research in Security and Privacy, 1991. Proceedings., May 20-21, 1991 pp. 316-326.*
Anton et al., "Calculus with Analytic Geometry" 5th Edition, 1995. pp. 352-354, 383, and 384.*

* cited by examiner

*Primary Examiner* — Jeffrey R West
(74) *Attorney, Agent, or Firm* — Anna L. Linne; Hoffman Warnick LLC

(57) ABSTRACT

A system, method and program product for processing irregularly occurring data events in real time. A system is provided for processing a stream of data events occurring over irregular time periods, including: a system for updating a running estimate each time a new data event is detected, wherein the running estimate is calculated based on a value associated with the new data event, an amount of time that elapsed since a previous data event was detected, and a previously calculated running estimate; and an analysis system that analyzes the running estimate after it is updated to identify a suspect data event value.

12 Claims, 3 Drawing Sheets

PROCESSING IRREGULARLY OCCURING DATA EVENTS IN REAL TIME

FIELD OF THE INVENTION

The invention relates generally to analyzing event data, and more particularly to a system and method of providing real time data analysis for irregularly occurring events.

BACKGROUND OF THE INVENTION

There exist numerous applications in which real time data analysis may be required. For example, data events may be collected in a financial setting to identify potentially fraudulent activity, in a network setting to track network usage, in a business setting to identify business opportunities or problems, etc. Challenges however arise when analyzing data events in real time since historical data values are typically necessary to identify trends and patterns. Namely, accessing historical data can be a relatively slow process, and thus limits real time processing. There exist various known techniques (e.g., running estimates, etc.) for analyzing data events in real time (or near real time) when the events occur at regular intervals. However, it is much more difficult to analyze data events in real time when the events occur at irregular time periods.

One way to handle events occurring at irregular time periods is to collect a set of irregular (low level) events and generate regular (high level) events. For example, the low level event may be someone making an automated teller machine (ATM) withdrawal, taking a flight, logging on to a system, etc. The higher level event may be the total number of withdrawals in a day, the number of flights taken in a month, or the number of logins to a data access system in a shift. If more numeric information is available with the low level event, e.g., dollars withdrawn, flight miles or bytes transferred, these may then be summed for the high level event to give, e.g., total dollars withdrawn in a day, total flight miles in a month, or the total data transferred in a shift.

The generation of higher level events has drawbacks. Namely, the collection of event data is dependent on a higher level regular time interval that may be arbitrarily chosen. This time interval must be long enough to collect enough statistically significant lower level events. However, because analysis cannot take place until the end of the higher level event time interval, real time processing is again limited. For example, it would be best to observe irregular data transfer patterns as they happen, rather than at the end of the shift.

Accordingly, a need exists for a system and method of providing real time data analysis for irregularly occurring events.

SUMMARY OF THE INVENTION

The present invention addresses the above-mentioned problems, as well as others, by using a variant of exponential smoothing to analyze individual irregularly occurring events. In a first aspect, the invention provides a system for processing a stream of data events occurring over irregular time periods, comprising: a system for updating a running estimate each time a new data event is obtained, wherein the running estimate is calculated based on a value associated with the new data event, an amount of time that elapsed since a previous data event was obtained, and a previously calculated running estimate; and an analysis system for analyzing the running estimate after it is updated.

In a second aspect, the invention provides a computer program product stored on a computer readable medium, which when executed, processes a stream of data events occurring over irregular time periods, the computer program product comprising: program code configured for updating a running estimate each time a new data event is obtained, wherein the running estimate is calculated based on a value associated with the new data event, an amount of time that elapsed since a previous data event was obtained, and a previously calculated running estimate; and program code configured for analyzing the running estimate each time it is updated to identify a suspect data event value.

In a third aspect, the invention provides method of processing a stream of data events occurring over irregular time periods, comprising: updating a running estimate each time a new data event is obtained, wherein the running estimate is calculated based on a value associated with the new data event, an amount of time that elapsed since a previous data event was obtained, and a previously calculated running estimate; and analyzing the running estimate each time it is updated.

The disclosed techniques have advantages over the prior art, including that processing works more efficiently for data that does not naturally follow a Gaussian distribution; the processing requires little running state information per event data stream (i.e., just a single data event value is required); and the computation is inexpensive.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
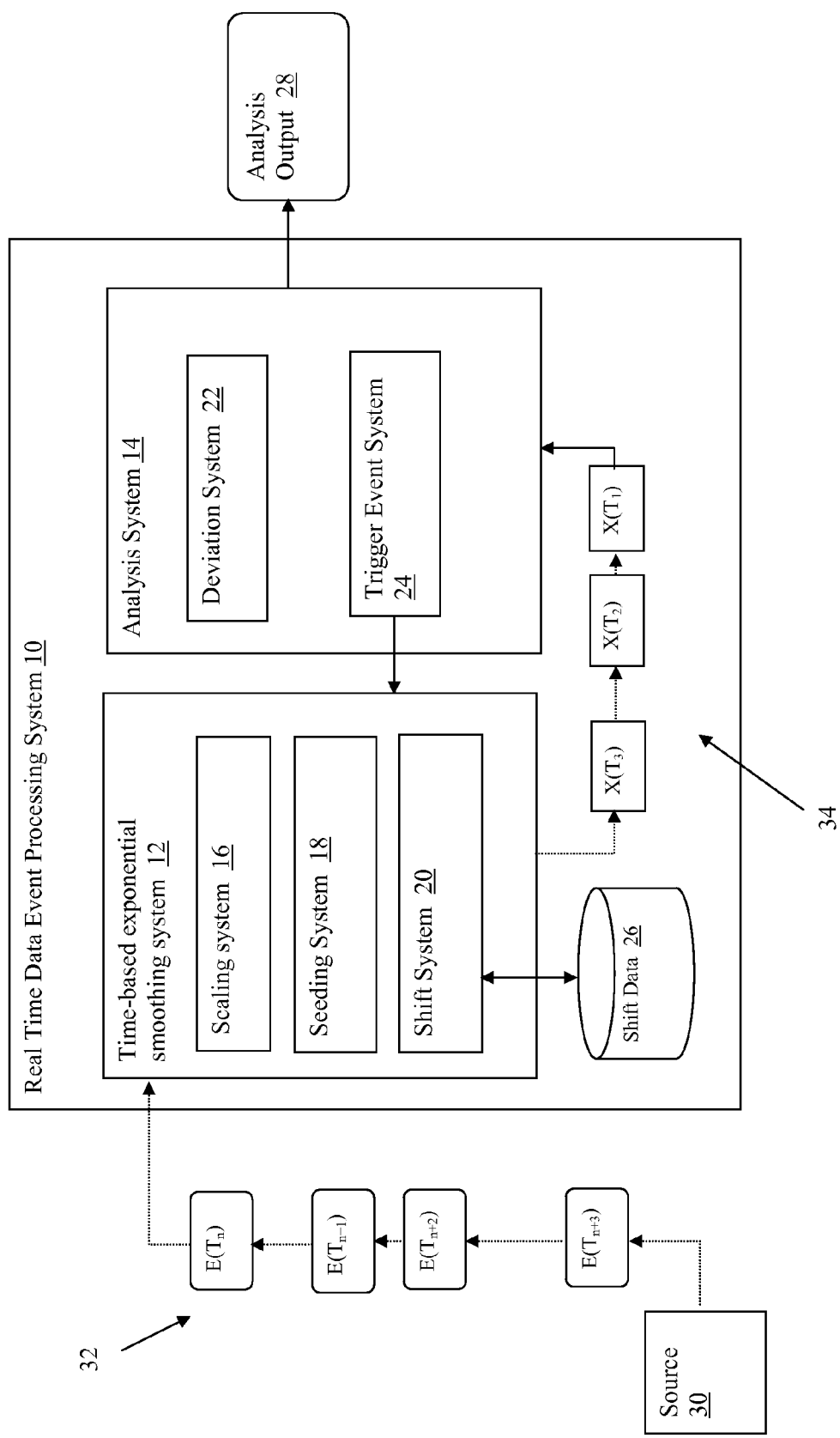
FIG. 1 depicts a real time data event processing system in accordance with an embodiment of the present invention.

Referring now to drawings, FIG. 1 depicts a real time data event processing system 10 that receives and processes a stream of data events 32 at irregular time intervals from a source 30. Data events 32 may comprise any type of information that is created, generated, transmitted and/or received (i.e., "obtained") over time. In some instances, data events 32 will comprise numeric values, e.g., withdrawal amounts, bit usage, etc., whereas in other instances, data events 32 may simply comprise a binary value resulting from an occurrence or non-occurrence, e.g., a login, a withdrawal, etc.

Processing generally includes: (1) updating a running estimate each time a new data event is obtained; and (2) analyzing the running estimate value after the estimate is updated. Each data event E(T) includes an associated value and a time T at which the data event was obtained. Time-based exponential smoothing system 12 updates running estimate X(T) 34 each time a data event is obtained. Running estimate X(T) 34 provides a statistical assessment of the stream of data events 32, taking into account both the most recently obtained data event and past data events, i.e., obtained at T-1, T-2, etc. Because a running estimate is used, the need to store and access historical data values is eliminated and real time processing can be more easily achieved.

Analysis system 14 provides mechanisms (e.g., algorithms, programs, heuristics, modeling, etc.) for identifying suspect data event values based on the running estimates 34, either individually, or in sets, and for generating an analysis output 28. Illustrative types of analysis may include identifying potentially fraudulent activities, identifying trends and patterns, identifying risks, problems, problems, etc. For example, a high running estimate 34 may indicate an unusually large withdrawal from an ATM, an unusual amount of bandwidth usage in a network, etc.

In a simple application, analysis system 14 might compare the running estimate to a threshold value. If the running value estimate is above (or below) the threshold value, analysis system 14 may issue a warning as the analysis output 28. In a more complex application, analysis system 14 could track the deviation of events from the norm, using deviation system 22. This may be a necessary part of detecting unexpectedly large deviations, as it gives an indication of expected deviation.

Because the running estimate 34 is reduced to a single value, few computational resources are required, thus allowing real time processing. Accordingly, real time data event processing system 10 allows for an immediate action or response to be made to unusual or potentially problematic data event values, without the need to process large amounts of data.

In some instances, analysis system 14 may include code or a mechanism for analyzing historical data. In this case, the running estimate can be used to provide an initial filtering of suspect events to identify cases when it is not worth accessing historical data from storage.

Operation of time-based exponential smoothing system 12 may be implemented as follows. For each date event stream 32 (FIG. 1 shows a single stream, but more than one could be processed in parallel), the most recently calculated running estimate X(T) and time T of that estimate are stored. Typically the recorded running estimate X(T) is updated as each new data event occurs, but this is not always the case.

The basic principal of time-based exponential smoothing system 12 flows from the "continuous time-based" equation:

$$x(t)=X(T)*K^{(t-T)},$$

where x(t) is the running estimate at any time t based on the latest recorded estimate X(T) at time T. K is an exponential smoothing factor $$K=0.5^{(1/H)}$$

where H is a half-life value that can be selected by a user or system. The half-life is the time over which the effect of a particular observation has decayed to half of the original strength. With exponential decay, the effect never completely disappears, so half-life is a common and convenient concept to describe the rate of decay. Accordingly, half-life H provides an intuitive mechanism for setting the parameters.

From the above equation is derived an "event-based" smoothing equation for calculating a new running estimate X(T') for a new event value E(T') at time T', which is based on a value associated with the new data event E(T'), an amount of time that elapsed since a previous data event was obtained T'-T, and a previously calculated running estimate X(T).

$$X(T')=E(T')+X(T)*K^{(T'-T)}.$$

In the case where the data event values correspond to non-numeric data (e.g., a login), the event value E(T) can be assigned a binary value, e.g., 1. In the case where event values E(T) correspond to numeric values (e.g., bytes transferred, dollars withdrawn, etc.), E(T) will have the corresponding numeric value. The computed values X(T') and x(t) will provide a consistent reading for a given value of K that may be used to detect irregular behavior.

In some cases, scaling system 16 may be utilized to make the running estimate X(T') more interpretable. To achieve this, the previous running estimate value X(T) is scaled by a scaling factor KS according to the equation:

$$KS=1/(\text{integral }[t=0\ldots\text{infinity}]\,K^t dt),$$

to provide a variant of the above smoothing equation as follows:

$$X(T')=E(T')*KS+X(T)*K^{(T'-T)}.$$

With this variation, the values X(T') and x(t) will give a direct smoothed estimate of a rate, e.g., the number of logins per time over an 8-hour shift, the rate of bytes transferred per hour, etc. This may make it easier to prepare and understand models and results.

Figure 2:
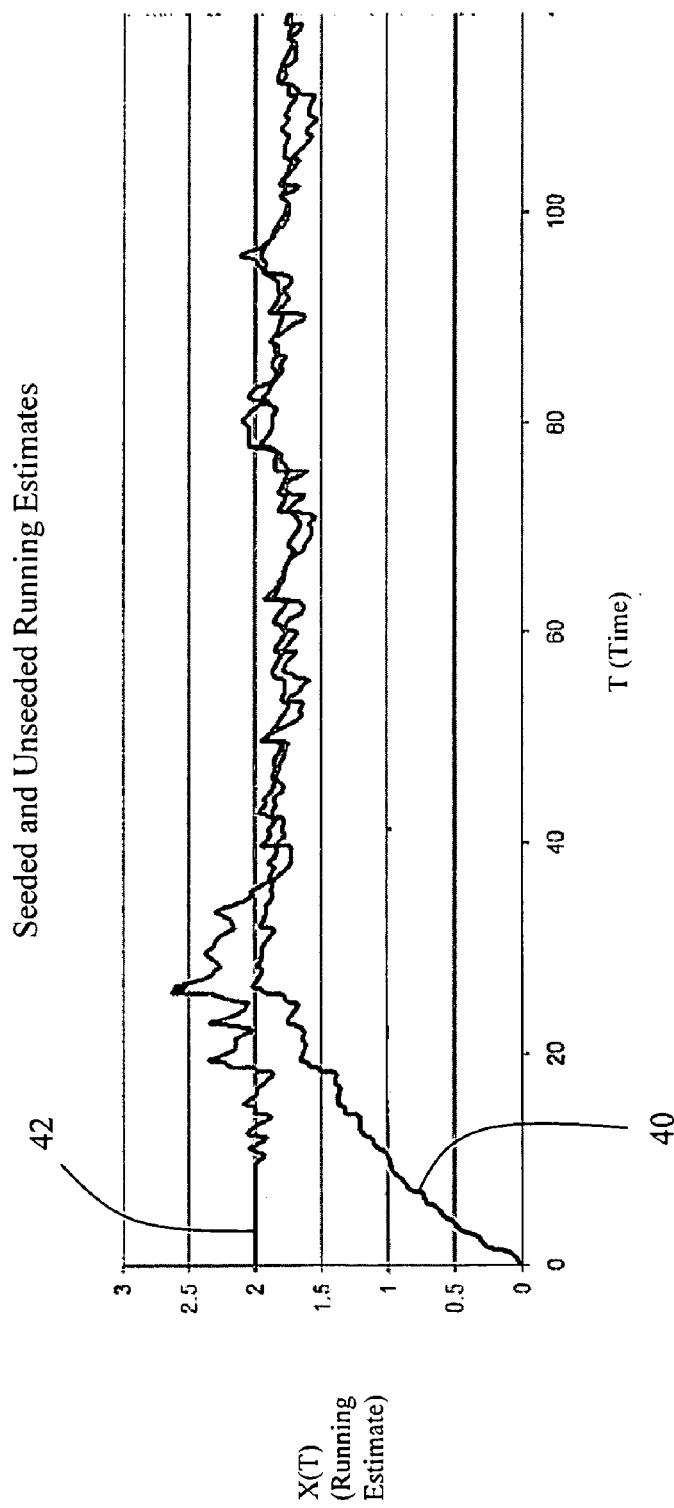
FIG. 2 depicts a graph of running estimates calculated in accordance with an embodiment of the present invention.

Seeding system 18 provides a mechanism for "seeding" the smoothing equations described above. In particular, because the above smoothing equations rely on previously calculated running estimates X(T), a learning phase is required for calculated running estimate values to gradually approach correct values. An example of this is shown in FIG. 2, which displays curves for "unseeded" running estimate data 40 and seeded running estimate data 42. As can be seen for the unseeded running estimate data 40, it takes until time 20 before the smoothing equation stabilizes. To address this, seeding system 18 can "seed" the smoothing equation with an initial value for X(T). The seed value could be selected in any manner, e.g., from statistical analysis of historic data, etc.

If seeding is not possible, the running estimates will eventually achieve correct values after a period of time. Where real time learning is necessary, a shorter half life value H may be used in the learning phase for faster learning, and then larger values later for greater stability. Alternatively, if memory is available, an initial estimate can be computed from a window over the first few observations.

Shift system 20 provides a mechanism for handling different patterns that are expected during different periods or "shifts." For example, in a model based on computer usage during work shifts, very different patterns may be expected between day and night. Namely, during the day shift, much more usage is expected than during the night shift. To handle this, shift system 20 can be configured to store shift data 26 comprising the running results from the end of a first shift. Starting values for a second shift (which were previously stored) can then be retrieved and used for the start of the second shift, and so on.

In this case, shift system 20 may utilize the function x(t), described above, to calculate and store beginning and ending shift data. The function x(t) can be used at a point in time other than the occurrence of a standard event E(T). Processing using shifts may be implemented as follows, where a given shift (e.g., a Monday day shift) has an end time SET, and the next equivalent shift (e.g., a Tuesday day shift) has start time SST.

At end of shift SET, shift data X(T') and T' are computed and saved away, where:

$$X(T')=X(T)*K^{(SET-T)}$$

and T'=SET. At the start of the next equivalent shift SST, the shift data 26 is utilized to reestablish X(T') and T'. Namely, $$X(T)=X(T')$$

T'=SST

Trigger event system 24 provides a mechanism to guard against the result of inactivity, i.e., large gaps that might occur between data events, by generating a timer event if a data event does not occur for a predetermined amount of time. Typically, data event values are all positive, so the function x(t) tends to slowly deflate in the gap between data events, and then jump up again as each new data event arrives. In the case where analysis system 14 is looking for deviations that are above expectation values, such deviations will naturally be triggered by a new data event, as that is where the high water mark of the expectation graph is. However, in the case where analysis system 14 is looking for deviations below expectation values, such deviations will happen partly because of the lack of data events. Trigger event system 24 addresses this problem by utilizing "timer" events.

Each time an event happens, new values X(T') and T' are known. In addition, a low value trigger point (TRIGGER) is also defined. For example, TRIGGER may be predefined as two running standard deviations below the running average value. In cases where X (T') is not zero, a time TRIGT is thus computed at which X(TRIGT) will drop to TRIGGER, at which a timer event is set.

$$TRIGGER=X(T')*K^{(TRIGT-T')}$$

$$TRIGT=T'+LOG\text{-}base\text{-}K(TRIGGER/X(T')).$$

If a "standard" event is obtained before the timer event TRIGT occurs, the timer event is canceled and a new timer event is computed. If the timer event TRIGT occurs before a standard event, this indicates that the low value trigger point (TRIGGER) has been hit. In this case, some action can be taken, e.g., an "exception" event can be sent to analysis output 28.

If it is expensive in the system to hold many timer events, timer events for well-behaved series that do not appear to be in danger of dropping too low need not be generated. Potential low performers can be reevaluated at a global periodic interval; and any timer events which are calculated to fall beyond the next periodic interval are not setup as timers.

Note that time measurements can be implemented in any time units; these units may be anything from microseconds or less to years or more depending on the application.

Figure 3:
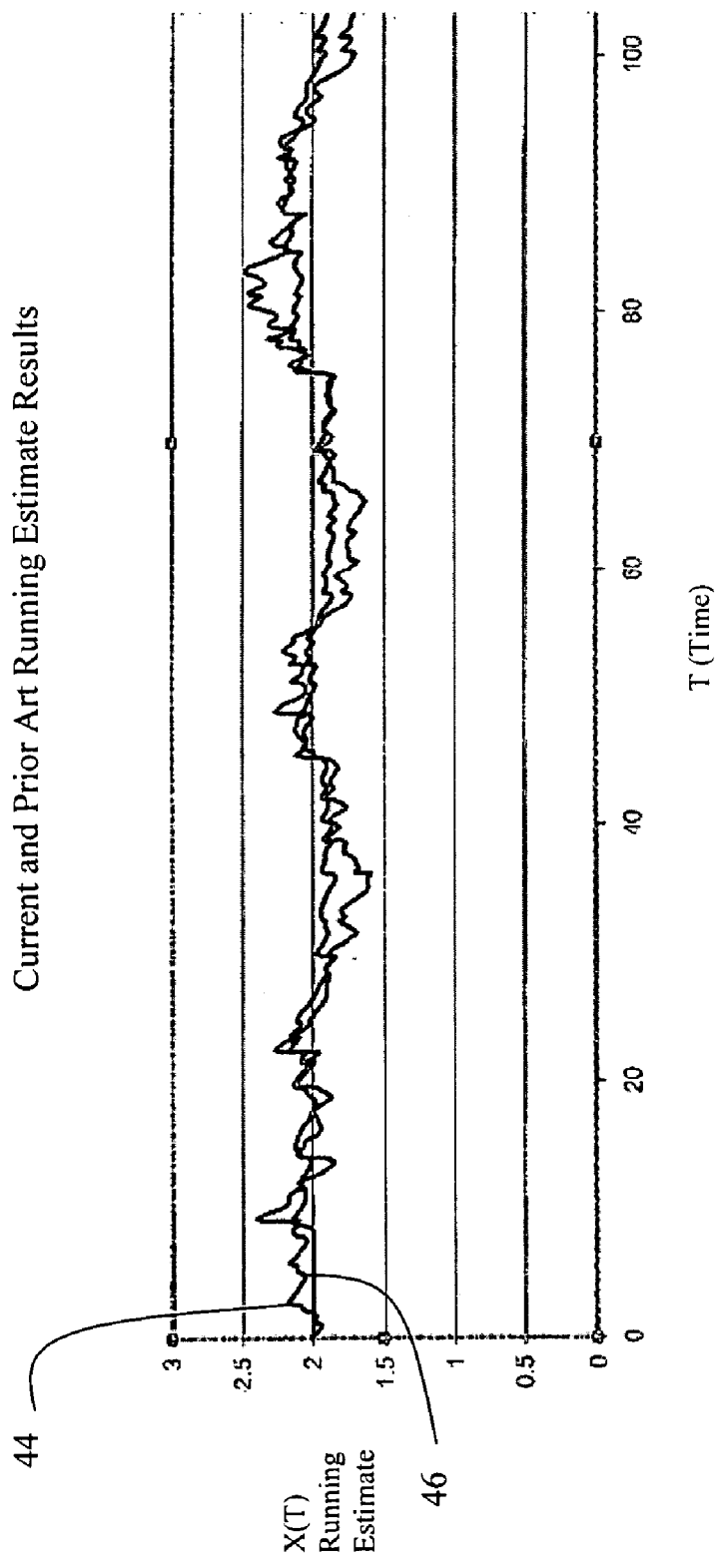
FIG. 3 depicts a comparison of results obtained in accordance with an embodiment of the present invention versus a prior art technique.

FIG. 3 shows running estimate data 44 obtained using an implementation of the present invention versus data 46 obtained from a running window application. It can be seen that the results for the two techniques are similar in nature, but in the running window application, 20 data points are required to calculate each estimate.

In general, real time data event processing system 10 may be implemented using any type of computing device, and may be implemented as part of a client and/or a server. Such a computing system generally includes a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus provides a communication link between each of the components in the computing system and likewise may comprise any known type of transmission link, including electrical, optical, wireless, etc. Additional components, such as cache memory, communication systems, system software, etc., may be incorporated into the computing system.

Access to real time event data processing system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a real time data event processing system 10 could be created, maintained and/or deployed by a service provider that offers the functions described herein for customers. That is, a service provider could offer to provide event processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention clamed is:

1. A computer device for real time processing of a stream of data events, comprising:

at least one processing unit; a memory operably associated with the at least one processing unit; and a real time data event processor stored in the memory and executable by the at least one processing unit, the real time data event processor comprising:
  a seeding system for generating an initial value for a running estimate based on statistical analysis of historical data for the stream of data events;
  a time-based exponential smoother for updating the running estimate in response to every time a new data event is obtained, wherein data events in the stream of data events occur over irregular time periods,
    wherein the time-based exponential smoother calculates the running estimate based on a value associated with the new data event, an amount of time that elapsed since a previous data event was obtained, and a previously calculated running estimate,
    wherein the time-based exponential smoother does not store and utilize from storage a previous data event value to update the running estimate; and
  an analyzer for analyzing the running estimate after it is updated and outputting an analysis,
    the analyzer further issuing a warning in a case in which the running estimate is above or below a threshold value;
  wherein the time-based exponential smoother further calculates the running estimate X(T') using the following equation:

$$X(T')=E(T')*KS + X(T)*K^{(T'-T)}, \text{wherein:}$$

E(T') is the value of the new data event detected at time T';
  X(T) is the previously calculated running estimate for the previous data event detected at time T;
  $K=0.5^{(1/H)}$;
  H is a half-life value; and
  $KS=1(\text{integral}[t=0 \ldots \text{infinity}]K^t dt)$, and
  a trigger event system for automatically generating a timer event if a gap between two data events exceeds a predetermined threshold, wherein a low value trigger point (TRIGGER) is defined, and a time (TRIGT) at which X(TRIGT) will drop to TRIGGER is computed according to the equation,)

$$TRIGGER = X(T')*K^{(TRIGT-T')}$$

$$TRIGT = T' + \text{LOG-base-}K(TRIGGER/X(T'))$$

and wherein the timer event is set at time TRIGT.

2. The computer device of claim 1, the time-based exponential smoother further comprising a shift system for storing and retrieving shift data at a beginning and end of each of a set of predefined shifts.

3. The computer device of claim 1, wherein the value associated with the new data event is binary in a case in which the data event is associated with non-numeric data, and wherein the value associated with the new data event is numeric in a case in which the data event is associated with numeric data.

4. The computer device of claim 1, wherein a shorter half life value H is used in a learning phase, and a larger half life value H is used subsequently.

5. A non-transitory computer readable medium storing computer instructions which when executed, cause a computing device to process in real time a stream of data events, the computer instructions comprising:
  generating an initial value for a running estimate based on statistical analysis of historical data for the stream of data events;
  updating the running estimate in response to every time a new data event is obtained,
    wherein data events in the stream of data events occur over irregular time periods,
    wherein the running estimate is calculated based on a value associated with the new data event, an amount of time that elapsed since a previous data event was obtained, and a previously calculated running estimate, wherein the updating does not include storing and utilizing from storage a previous data event value to update the running estimate;
  analyzing the running estimate each time it is updated to identify a suspect data event value and outputting an analysis, the analysis including issuing a warning in a case in which the running estimate is above or below a threshold value;
  wherein the running estimate X(T') is calculated using the following equation:

$$X(T')=E(T')+X(T)*K^{(T'-T)}, \text{wherein:}$$

E(T') is the value of the new data event detected at time T';
  X(T) is the previously calculated running estimate for the previous data event detected at time T;
  $K=0.5^{(1/H)}$; and
  H is a half-life value, and
  automatically generating a timer event if a gap between two data events exceeds a predetermined threshold, wherein a low value trigger point (TRIGGER) is defined, and a time (TRIGT) at which X(TRIGT) will drop to TRIGGER is computed according to the equation, $$TRIGGER = X(T')*K^{(TRIGT-T')}$$

$$TRIGT = T' + \text{LOG-base-}K(TRIGGER/X(T'))$$

and wherein the timer event is set at time TRIGT.

6. The non-transitory computer readable medium storing computer instructions of claim 5 the instructions further comprising storing and retrieving shift data at a beginning and end of each of a set of predefined shifts.

7. The non-transitory computer readable medium storing computer instructions of claim 5, wherein the value associated with the new data event is binary in a case in which the data event is associated with non-numeric data, and wherein the value associated with the new data event is numeric in a case in which the data event is associated with numeric data.

8. The non-transitory computer readable medium storing computer instructions of claim 5, wherein a shorter half life value H is used in a learning phase, and a larger half life value H is used subsequently.

9. A method of processing in real time on a computing device a stream of data events, comprising:
  on a processor,
  generating an initial value for a running estimate based on statistical analysis of historical data for the stream of data events;
  updating the running estimate in response to every time a new data event is obtained,
    wherein data events in the stream of data events occur over irregular time periods,
    wherein the running estimate is calculated based on a value associated with the new data event, an amount of time that elapsed since a previous data event was obtained, and a previously calculated running estimate, wherein the running estimate is updated without storing a previous data event value;
  analyzing the running estimate each time it is updated;

outputting an analysis, the outputting including issuing a warning in a case in which the running estimate is above or below a threshold value;

wherein the running estimate X(T') is calculated using the following equation:

$$X(T')=E(T')*KS+X(T)*K^{(T'-T)}, \text{wherein:}$$

E(T') is the value of the new data event detected at time T';
X(T) is the previously calculated running estimate for the previous data event detected at time T;
$K=0.5^{(1/H)}$;
H is a half-life value; and $$KS=1/(\text{integral}[t=0 \ldots \text{infinity}]K^t dt),$$

the equation being stored in a memory, and
automatically generating a timer event if a gap between two data events exceeds a predetermined threshold, wherein a low value trigger point (TRIGGER) is defined, and a time (TRIGT) at which X(TRIGT) will drop to TRIGGER is computed according to the equation, $$\text{TRIGGER}=X(T')*K^{(TRIGT-T')}$$

$$\text{TRIGT}=T'+\text{LOG-base-}K(\text{TRIGGER}/X(T'))$$

and wherein the timer event is set at time TRIGT.

10. The method of claim 9, further comprising storing and retrieving shift data at a beginning and end of each of a set of predefined shifts.

11. The method of claim 9, wherein the value associated with the new data event is binary in a case in which the data event is associated with non-numeric data, and wherein the value associated with the new data event is numeric in a case in which the data event is associated with numeric data.

12. The method of claim 9, wherein a shorter half life value H is used in a learning phase, and a larger half life value H is used subsequently.

* * * * *